UNITED STATES PATENT OFFICE.

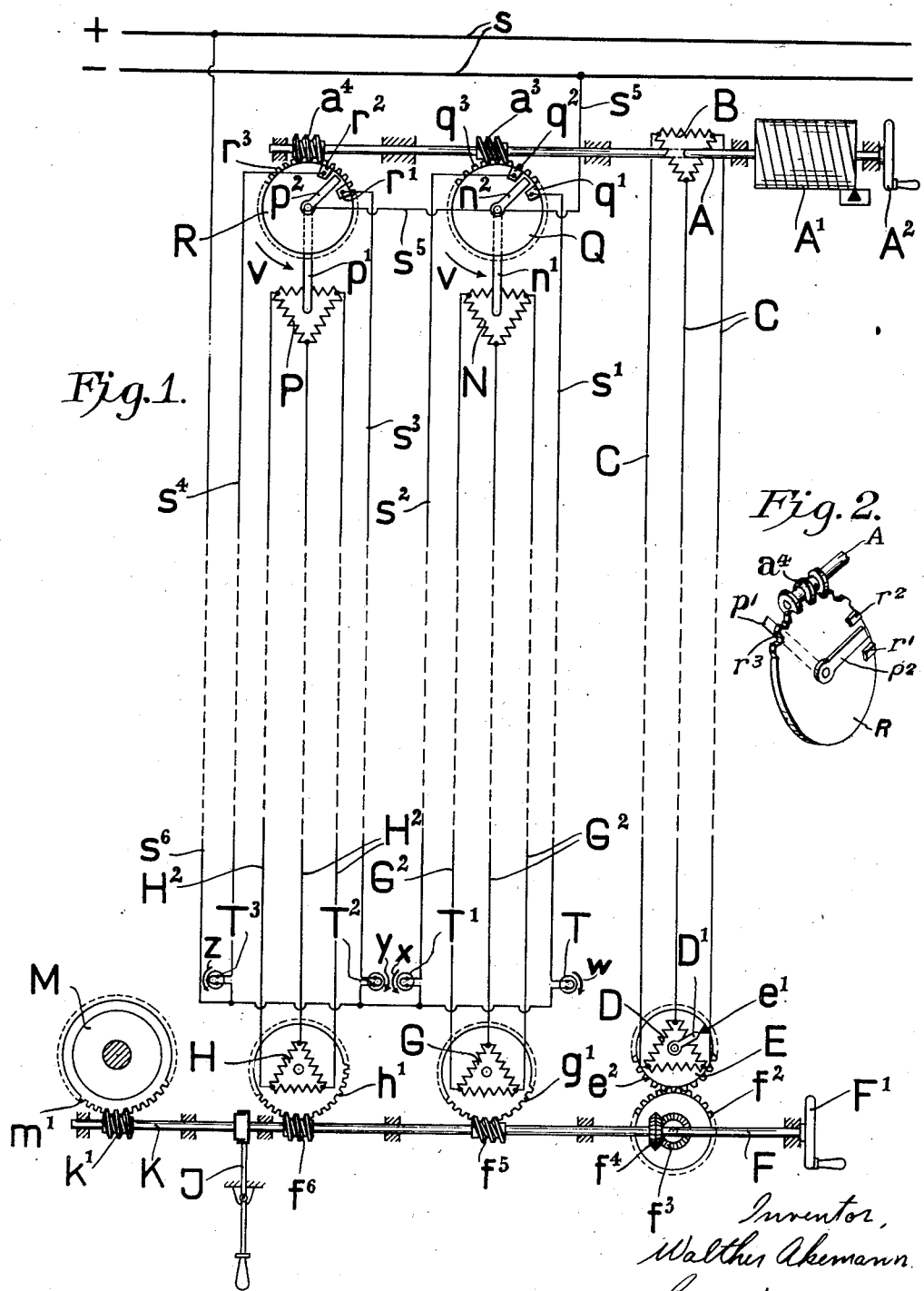

WALTHER AKEMANN, OF ESSEN, GERMANY, ASSIGNOR TO FRIED. KRUPP AKTIEN-GESELLSCHAFT, OF ESSEN-ON-THE-RUHR, GERMANY.

LONG-DISTANCE CONTROL AND SIGNAL DEVICE.

1,375,438.  Specification of Letters Patent.  Patented Apr. 19, 1921.

Application filed September 3, 1920. Serial No. 408,071.

*To all whom it may concern:*

Be it known that I, Dr. WALTHER AKEMANN, residing at Essen, Germany, a citizen of the German Republic, have invented a certain new and useful Improvement in Long-Distance Control and Signal Devices, of which the following is a specification.

This invention relates to apparatus for the indication at a distance of the movements of pointers or the like with a synchronously working transmitter and receiver and with a coöperating pointer positively connected with the object which is to be adjusted, and the object of the invention is to provide an apparatus of this kind, the range of adjustment of which is a multiple of the range of adjustment otherwise obtainable and in which it is also possible to ascertain at the receiving station, whether the difference between the adjustments of the transmitter and of the object, which is to be adjusted, according to the indications of the corresponding receiver is very large or not. The apparatus according to the present invention therefore permits of the time taken for the adjustment operation being materially curtailed by the fact, that the driving member of the object to be adjusted is rotated at an increased speed for such time as the aforesaid difference is great.

The invention will be described with reference to the accompanying drawings, in which:

Figure 1 is a diagrammatic illustration of the invention and

Fig. 2 is a fragmentary perspective view of one part of the arrangement illustrated in Fig. 1.

A shaft A, which drives a transmitter B, has keyed upon it a drum $A^1$, coöperating with an adjustable mark, which drum is provided with a graduation and can be rotated together with the transmitter B by means of a hand wheel $A^2$. The rotation of the transmitter B is transmitted by long distance conductors C in the usual way to a receiver D working synchronously with the transmitter. The graduations of the receiver are read by a pointer $D^1$ rigidly connected to the armature of the receiver D and a mark $e^1$, which is arranged on the periphery of a disk E, which disk can be rotated freely relatively to the pointer $D^1$. The disk E is positively connected by means of a toothed wheel gearing $e^2$ $f^2$ $f^3$ $f^4$ (as shown in the drawing) with a shaft F provided with a hand wheel $F^1$.

This shaft F is positively connected on the one hand by means of two worm wheel gears $f^5$ $g^1$ and $f^6$ $h^1$ with the adjustable parts of two auxiliary transmitters G and H and on the other hand by means of a clutch J with a coaxial shaft K, which latter in its turn is connected to the object M, which is to be adjusted, by means of a worm wheel gearing $k^1$ $m^1$. The range of adjustment of the object to be adjusted is equal to the range of adjustment of the drum $A^1$. The ratio of transmission of the toothed wheel gearing $f^4$ $f^3$ $f^2$ $e^2$ provided for the driving of the disk E is such that the disk E makes the same number of revolutions as the transmitter B when the object to be adjusted M is passed over its whole range of adjustment.

The ratio of transmission of the worm wheel gearing $f^6$ $h^1$ and $f^5$ $g^1$ is such, that the entire range of adjustment of the object to be adjusted M corresponds to a single revolution of the auxiliary transmitter H and a whole cycle of revolutions of the auxiliary transmitter G, which is materially smaller (*e. g.* $\frac{1}{10}$) than the number of revolutions of the disk E or the transmitter B corresponds to the entire range of adjustment of the object M to be adjusted.

The auxiliary transmitters G and H are connected by conductors $G^2$ and $H^2$ with auxiliary receivers N and P placed at the transmitting station and working synchronously with the corresponding auxiliary transmitters and the shafts $n^1$ and $p^1$ of which each carry a contact arm $n^2$ $p^2$. Coaxially with the auxiliary receivers N and P and the contact arms $n^2$ and $p^2$ are mounted two contact disks Q and R, which rotate loosely relatively to the corresponding shafts $n^1$ and $p^1$ and are each provided in the manner shown in the drawing with two contact pieces $q^1$ $q^2$ and $r^1$ $r^2$, which project from the end faces of the disks Q and R and into the gaps between which contact arms $n^2$ and $p^2$ may enter with a certain amount of play.

The contact disks Q and R are positively connected to the hand wheel $A^2$, which drives the transmitter B by means of worm wheel gears $a^3$ $q^3$ and $a^4$ $r^3$ respectively. The ratio of transmission of the gearing $a^4$ $r^3$ is equal to that of the gear $f^6$ $h^1$, that of the gear $a^3$ $q^3$ and to that of the gear $f^5$ $g^1$, so that the entire range of adjustment of the drum $A^1$ corresponds to a single revolution of the disk R and a number of revolutions of the disk Q, which is equal to the number of revolutions made by the auxiliary transmitter G, when the object M to be adjusted has passed over its entire range of adjustment. The arms $n^2$ and $p^2$ form together with the contact pieces $q^1$ $q^2$ and $r^1$ $r^2$ contact devices, which are adapted to open or close signaling circuits according to the relative position of the said contact pieces.

The signaling circuits are formed by four conductors $s^1$, $s^2$, $s^3$ and $s^4$, which lead from the contact pieces $q^1$ $q^2$ and $r^1$ $r^2$ to signal lamps T, $T^1$, $T^2$ and $T^3$ respectively and are connected by conductors $s^5$ and $s^6$ which are attached to the contact arms $n^2$ and $p^2$ and to the signal lamps T, $T^1$, $T^2$, $T^3$ with both terminals of an alternating current source S. In the vicinity of the signal lamps T, $T^1$, $T^2$, $T^3$ are arranged in the manner shown in the drawing arrows $w$, $x$, $y$ and $z$, which, when the corresponding lamp lights up, are themselves illuminated and are adapted for indicating the particular direction of rotation of the hand wheel $F^1$ which is required, in a manner to be hereinafter described.

In the description of the working of the above described apparatus we shall start from the position of the various parts shown in the drawing in which the reading off mark coöperating with the drum $A^1$ is in the zero position and the hand wheel $F^1$ is in an angular position, which corresponds to the zero position of the object M to be adjusted. In this position of the parts the contact arms $n^2$ and $p^2$ are situated exactly in the middle of the contact pieces $q^1$ $q^2$ and $r^1$ $r^2$ which are located on either side of them respectively, so that none of the lamps T, $T^1$, $T^2$, $T^3$ at the receiving station are lighted up. The pointer $D^1$ of the receiver is situated opposite the mark $e^1$.

If now the hand wheel $A^2$ of the transmitter B be rotated until the adjustable mark points to the desired graduation mark of the graduation of the drum $A^1$, the receiver D, which works synchronously with the transmitter B and with it the pointer $D^1$, pass through an equiangular rotation. The rotation of the transmitter B is also taken part in by the contact disks Q and R positively connected therewith and in such a way that the entire range of adjustment of the drum $A^1$ corresponds to a considerably smaller number of revolutions of the contact disks and a single revolution of the contact disk R. Let it be assumed, that the rotation of the contact disks Q and R takes place in the direction of the arrow $v$.

When the contact disks Q and R rotate, the contact piece $q^1$, as the rotation of the contact disk Q takes place at a considerably greater angular velocity than that of the contact disk R, first bears with its inner face against the contact arm $n^2$, which was previously at rest and later on the contact piece $r^1$ bears with its corresponding face against the contact arm $p^2$, in consequence of which the contact arms $n^2$ and $p^2$ and therefore also the auxiliary receivers N and P are carried along by the contact disks Q and R in the further course of their rotary movement.

The amount of play between the contact arms $n^2$ and $p^2$ and the aforesaid contact pieces is calculated so that the rotating of the contact arm $n^2$ by the contact disk Q begins after half a revolution of the transmitter B and the rotating of the contact arm $p^2$ by the contact disk R after half a revolution of the contact disk Q, if the contact arms were (as stated) previously in their central position shown in the drawing. The rotating of the contact arms $n^2$ and $p^2$ as well as of the auxiliary receivers N and P themselves takes place against the directing force exerted by the auxiliary transmitters G and H on the auxiliary receivers H and P and which tends to hold the receivers N and P and consequently the contact arms $n^2$ and $p^2$ in their angular positions corresponding to the angular positions of the corresponding auxiliary transmitters G and H and therefore has to be overcome, when the handwheel $A^2$ is rotated.

The result of the bearing of the contact pieces $q^1$ and $r^1$ against the contact arms $n^2$ and $p^2$ is such that the branch circuits, which contain the lamps T and $T^2$, become closed and these lamps and also the arrows $w$ and $y$ corresponding thereto light up.

If now the object M to be adjusted is to be adjusted with reference to the signals shown by the illuminated arrows $w$ and $y$ and position of the pointer $D^1$ with reference to the mark $e^1$ to the angular position corresponding to the adjustment of the transmitter B, the handwheel $F^1$ provided with the adjustment of the object M must first be rotated so long in the direction of rotation determined by the illuminated arrows $w$ and $y$ until the illuminated arrow $v$ corresponding to the auxiliary transmitter H goes out.

The rotation of the hand wheel $F^1$ in the direction of the illuminated arrows $w$ and $y$ is taken part in by the two auxiliary transmitters H and G and also the disk E in the same direction, in which the auxiliary receivers P and N rotated by the contact disks R and Q and also the receiver D has rotated on the adjustment of the transmitter B. The auxiliary receivers P and N, which work synchronously with the auxiliary transmitters H and G, do not at first rotate therewith because they have already arrived during the adjustment of the transmitter B in an angular position which is different from the angular position of the corresponding auxiliary transmitters H and G in which they are held against the directing force exerted by the auxiliary transmitters H and G by the contact pieces $r^1$ and $q^1$. After the corresponding rotation of the hand wheel $F^1$ the auxiliary transmitter H finally arrives in an angular position which corresponds exactly to the angular position imparted to the auxiliary receiver when adjusting the transmitter B.

If now the hand wheel $F^1$ and with it the auxiliary transmitter H be rotated further in the given direction, the auxiliary receiver P begins to take part, under the action of the directing force exerted on it by the auxiliary transmitter H and at the same time rotates the contact arm $p^2$ in such a direction that the said arm $p^2$ again moves away from the contact piece $r^1$. The circuit in which the lamp $T^2$ lies, is therefore broken and the arrow corresponding to the auxiliary transmitter H is accordingly no longer illuminated.

As the auxiliary transmitter G takes part in the given rotation of the hand wheel $F^1$ with a considerably greater angular velocity than the auxiliary transmitter H, it already arrives at the commencement of the rotation of the hand wheel $F^1$ in an angular position which corresponds exactly to the angular position imparted to the auxiliary receiver N when adjusting the transmitter B and in which position the auxiliary receiver N is accordingly able to follow the further rotation of the auxiliary transmitter G. This continues until the contact arm $n^2$, which at the same time moves away from the contact piece $q^1$ and thus causes the lamp to go out, bears against the contact piece $q^2$ so that the lamp $T^1$ lights up.

In the further course of the given rotation of the hand wheel $F^1$ the auxiliary receiver N then again no longer takes part in the rotation of the auxiliary transmitter G, because it is prevented by the contact piece $q^2$ from rotating in the direction of the arrow $y$ and then again assumes every time an angular position corresponding to the position of the auxiliary transmitter G when the directing force exerted thereby lies in a direction in which the contact arm $n^2$ is able to set itself with respect to the contact pieces $q^1$ $q^2$ limiting its movement. On the given rotation of the hand wheel $F^1$, that is to say, so long as the arrow $y$ corresponding to the auxiliary transmitter H is illuminated, the arrows $w$ and $x$ at the auxiliary transmitter G therefore alternately light up. As, however, the hand wheel $F^1$ has to be rotated in the direction determined by the auxiliary transmitter H as long as one of its arrows $y$ and $z$ is illuminated, this fact cannot give any cause for misunderstandings.

By the extinction of illumination of the arrow $y$, the gun layer, who is rotating the hand wheel $F^1$, knows, that the adjustment of the object M to be adjusted has approached the adjustment of the transmitter B to a certain amount, which is smaller than the amount of play between the contact pieces $r^1$ $r^2$ and the contact arm $p^2$. Since, this amount of play on the further rotation of the hand wheel $F^1$ in the previous direction is passed through by the contact arm $p^2$ during the next revolution of the auxiliary transmitter G, the man, who rotates the hand wheel $F^1$, now turns his attention to the arrows $w$ and $x$ corresponding to the auxiliary transmitter G and rotates the hand wheel $F^1$ in the direction of the arrow $w$, which promptly lights up when the arrow $y$ goes out, until the signal lamp T which illuminates this arrow also goes out.

As soon as this is the case, the gun layer, who rotates the hand wheel $F^1$, knows that the adjustment of the object to be adjusted so nearly approached the adjustment of the transmitter that it agrees accurately therewith, as soon as the mark $e^1$ arrives opposite the pointer $D^1$ in the course of the next revolution of the hand wheel $F^1$. He therefore rotates the hand wheel in the direction of the arrow $w$, which is still illuminated, until at the latest after one revolution of the disk E or of the hand wheel $F^1$ the mark $e^1$ will coincide with the pointer $D^1$. As soon as the mark $e^1$ stands opposite the pointer D and none of the arrows are illuminated any longer the object M to be adjusted has attained the exact angular position imparted to the transmitter B.

As follows from the description of the working of the apparatus explained, the gun layer, who rotates the hand-wheel $F^1$, is in a position to rotate the hand wheel $F^1$ at an increased speed as long as one of the arrows corresponding to the auxiliary transmitter H lights up, without having to fear that he is imparting to the object M to be adjusted, an adjustment which exceeds that prescribed by the transmitter B. This therefore affords the possibility of enabling the objects to be adjusted, to be adjusted very rapidly and nevertheless accurately. At the same time the apparatus which forms part of the present invention permits of the use of a considerably larger number of revolutions of the transmitter B and consequently of a considerable increase in the range of adjustment of the object M to be adjusted, without the accuracy of the adjustment suffering as it would under otherwise equal conditions.

Claims.

1. An apparatus of the class described comprising a transmitter, a transmitter shaft, a receiver, means connecting said transmitter and said receiver whereby they are actuated synchronously, a pointer operated by said receiver, a coöperating pointer, an object to be adjusted, means for adjusting said object, said coöperating pointer being connected to said object adjusting means, auxiliary transmitters operatively connected to the object adjusting means, auxiliary receivers operatively connected to said auxiliary transmitters, contact devices comprising sets of disks and arms operable by said transmitter shaft and said auxiliary receivers respectively, signaling devices, means connecting said signaling devices to said contact devices, one of said sets of disks which is connected to said transmitter shaft and one of said auxiliary receivers being provided with a greater ratio of rotation than the others, said sets of disks having means thereon for carrying along said arms when the transmitter shaft is rotated against the directing force exerted by the auxiliary receivers.

2. An apparatus of the class described which comprises a transmitter, a transmitter shaft, a receiver, said transmitter and said receiver being connected so as to operate synchronously, a pointer connected to and operable with said receiver, a coöperating pointer, an object to be adjusted, means for adjusting said object, said means positively connecting said coöperating pointer to said object, two auxiliary transmitters operatively connected to said object, adjusting means, two auxiliary receivers operatively connected to said auxiliary transmitters, two contact devices comprising two sets of disks and arms operable by said transmitter shaft and said auxiliary receivers respectively, one of said auxiliary transmitters and one of said sets of disks being provided with a greater ratio of rotation than the other, signal lamps, means connecting said signal lamps to said contact devices, contact pieces projecting from said disks, said contact pieces adapted to engage the contact arms so that these contact arms are carried along by the contact disks when the transmitter is rotated against the action of the directing force exerted by the auxiliary receivers.

3. An apparatus of the class described which comprises a rotatable transmitter, a shaft therefor, a receiver connected for synchronous rotation with said transmitter, a pointer rotatable with said receiver, a coöperating pointer, an object to be adjusted, means positively connecting said coöperating pointer to said object, said means enabling the object to be adjusted, two auxiliary transmitters operatively connected to said object-adjusting means, two auxiliary receivers operatively connected to said auxiliary transmitters, one of said auxiliary receivers being provided with a greater ratio of rotation than the other, contact arms in operative connection with said auxiliary receivers and sets of contact disks in operative connection with said transmitter shaft, one of said sets of contact disks having a greater ratio of rotation than the other, an electrical circuit, signal lamps, said signal lamps being connected by said circuit to said contact arms and disks, spaced contact pieces projecting from said contact disks adjacent said arms, said contact pieces being adapted to engage said arms to carry them along when the transmitter is rotated against the action of the directing force exerted by the auxiliary receivers.

4. An apparatus of the class described which comprises a transmitter, a shaft rotatably supporting said transmitter, a receiver connected for synchronous operation with said transmitter, a pointer operable with said receiver, a coöperating pointer, an object to be adjusted, means for adjusting said object, said means positively connecting said coöperating mark to said object, two auxiliary transmitters connected to and operated by said object-adjusting means, two auxiliary receivers operatively connected to said auxiliary transmitters, two contact devices comprising disks and arms, and two pairs of signal lamps, two circuits, each connecting one of said contact devices to one of said pairs of signal lamps, one part of each of said contact devices being positively connected to said transmitter shaft and the other part of each of said contact devices being positively connected to said auxiliary receivers, one of said two parts of the contact devices which is connected to said transmitter shaft and one of said two auxiliary receivers being provided with a greater ratio of rotation than the other, said contact disks having means thereon to engage said arms to carry them along against the directing force exerted by the auxiliary receivers.

The foregoing specification signed at Essen, Germany, this 27th day of May, 1920.

DR. WALTHER AKEMANN.

In presence of—
 HANS GOTTSMANN,
 JOSEF OLBERTZ.